United States Patent
McLean et al.

(10) Patent No.: US 8,078,486 B1
(45) Date of Patent: *Dec. 13, 2011

(54) SYSTEMS AND METHODS FOR PROVIDING WORKFORCE OPTIMIZATION TO BRANCH AND BACK OFFICES

(75) Inventors: Nicholas Alexander McLean, The Village Finchampstead (GB); Shimon Keren, Sunnyvale, CA (US); Daryl Demos, Duxbury, MA (US); Michael Bourke, San Francisco, CA (US); Jason Fama, Redwood City, CA (US)

(73) Assignee: Verint Americas Inc., Melville, NY (US)

( * ) Notice: Subject to any disclaimer, the term of this patent is extended or adjusted under 35 U.S.C. 154(b) by 419 days.

This patent is subject to a terminal disclaimer.

(21) Appl. No.: 12/171,090

(22) Filed: Jul. 10, 2008

Related U.S. Application Data

(63) Continuation-in-part of application No. 11/540,185, filed on Sep. 29, 2006, which is a continuation-in-part of application No. 11/359,356, filed on Feb. 22, 2006.

(60) Provisional application No. 60/948,868, filed on Jul. 10, 2007.

(51) Int. Cl.
*G06F 9/44* (2006.01)

(52) U.S. Cl. ............... 705/7.14; 705/7.13; 705/7.15

(58) Field of Classification Search ......... 705/7.12–7.15
See application file for complete search history.

(56) References Cited

U.S. PATENT DOCUMENTS

| | | | |
|---|---|---|---|
| 6,044,355 A * | 3/2000 | Crockett et al. | 705/7.39 |
| 6,553,113 B1 * | 4/2003 | Dhir et al. | 379/265.02 |
| 6,611,498 B1 * | 8/2003 | Baker et al. | 370/252 |
| 6,628,777 B1 * | 9/2003 | McIllwaine et al. | 379/265.01 |
| 6,744,877 B1 * | 6/2004 | Edwards | 379/265.02 |
| 6,766,012 B1 * | 7/2004 | Crossley | 379/265.02 |
| 6,831,966 B1 * | 12/2004 | Tegan et al. | 379/88.16 |
| 6,845,155 B2 * | 1/2005 | Elsey | 379/266.04 |
| 6,970,829 B1 * | 11/2005 | Leamon | 705/7.14 |
| 7,092,509 B1 * | 8/2006 | Mears et al. | 379/266.01 |
| 7,110,523 B2 * | 9/2006 | Gagle et al. | 379/265.01 |
| 7,110,525 B1 | 9/2006 | Heller et al. | |
| 7,478,051 B2 | 1/2009 | Nourbakhsh et al. | |
| 7,725,339 B1 | 5/2010 | Aykin | |
| 2005/0094799 A1 * | 5/2005 | Elsey | 379/266.04 |
| 2006/0062376 A1 * | 3/2006 | Pickford | 379/265.12 |
| 2006/0227961 A1 * | 10/2006 | Lai et al. | 379/265.02 |

(Continued)

OTHER PUBLICATIONS

Quiggins et al ("A New approach to Contact Center Optimization," IEX Corporation, Jun. 21, 2004).*

(Continued)

*Primary Examiner* — Scott L Jarrett
*Assistant Examiner* — George H Walker

(57) ABSTRACT

Systems and methods for providing workforce optimization are provided. A representative method includes: planning a first campaign to implement business goals; scheduling and deploying a workforce in accordance with the campaign to produce a plurality of interactions, at least one of the interactions involving a customer and a first agent of a contact center, at least another of the interactions involving a customer and a second agent of a branch office or back office; measuring performance of the first agent and the second agent on at least a portion of the interactions to produce a set of quality metrics for the agents; combining at least a portion of quality metrics to produce performance indicators; and using the performance indicators in the planning step of a second campaign or another iteration of the first campaign.

15 Claims, 12 Drawing Sheets

U.S. PATENT DOCUMENTS

2006/0239440 A1* 10/2006 Shaffer et al. ............ 379/265.02
2007/0064912 A1*  3/2007 Kagan et al. ................ 379/265.1
2007/0226340 A1*  9/2007 Hastings et al. .............. 709/226
2008/0205611 A1*  8/2008 Jordan et al. ............. 379/112.04

OTHER PUBLICATIONS

Gans et al ("Telephone Call Centers: Tutorial, Review,and Research Prospects," Manufacturing & Service Operations Management, vol. 5, No. 2, Spring, 2003, pp. 79-141, 1523-4614/03/0502/0079, 1526-5498 electronic ISSN).*

Thomas R. Robbins "Managing service capacity under uncertainty." Ph.D. dissertation, The Pennsylvania State University, United States-Pennsylvania. Retrieved Mar. 15, 2011, from Accounting & Tax Periodicals.(Publication No. AAT 3284989).*

Aspect. "Call Center Intelligence." White Paper, 2007.*

Rodney B. Wallace and Ward Whitt. "A Staffing Algorithm for Call Centers with Skill-Based Routing." Manufacturing & Service Operations Management, vol. 7, No. 4, Fall 2005, pp. 276-294. issn 1523-4614 eissn 1526-5498 05 0704 0276.*

Vijay Mehrotra and Jason Fama. "Call Center Simulation Modeling: Methods, Challenges, and Opportunities." Proceedings of the 2003 Winter Simulation Conference, S. Chick, P. J. Sánchez, D. Ferrin, and D. J. Morrice, eds.. pp. 135-143.*

Paul Leamon. "Workforce Management for Skills Based Routing: The Need for Integrated Simulation." IEX White Paper, 2004.*

William Durr. "Spreadsheets and Workforce Management- An Odd Couple." A Blue Pumpkin White Paper, 2003.*

Aspect. "A Common Sense Approach to Intelligent Workforce Management." White Paper, 2005.*

Koole, Ger; Mandelbaum, Avishai, "Queueing Models of Call Centers: An Introduction," Annals of Operations Research, vol. 113, pp. 41-59, Jul. 2002, ISSN 0254-5330 (Print) 1572-9338 (Online).*

* cited by examiner

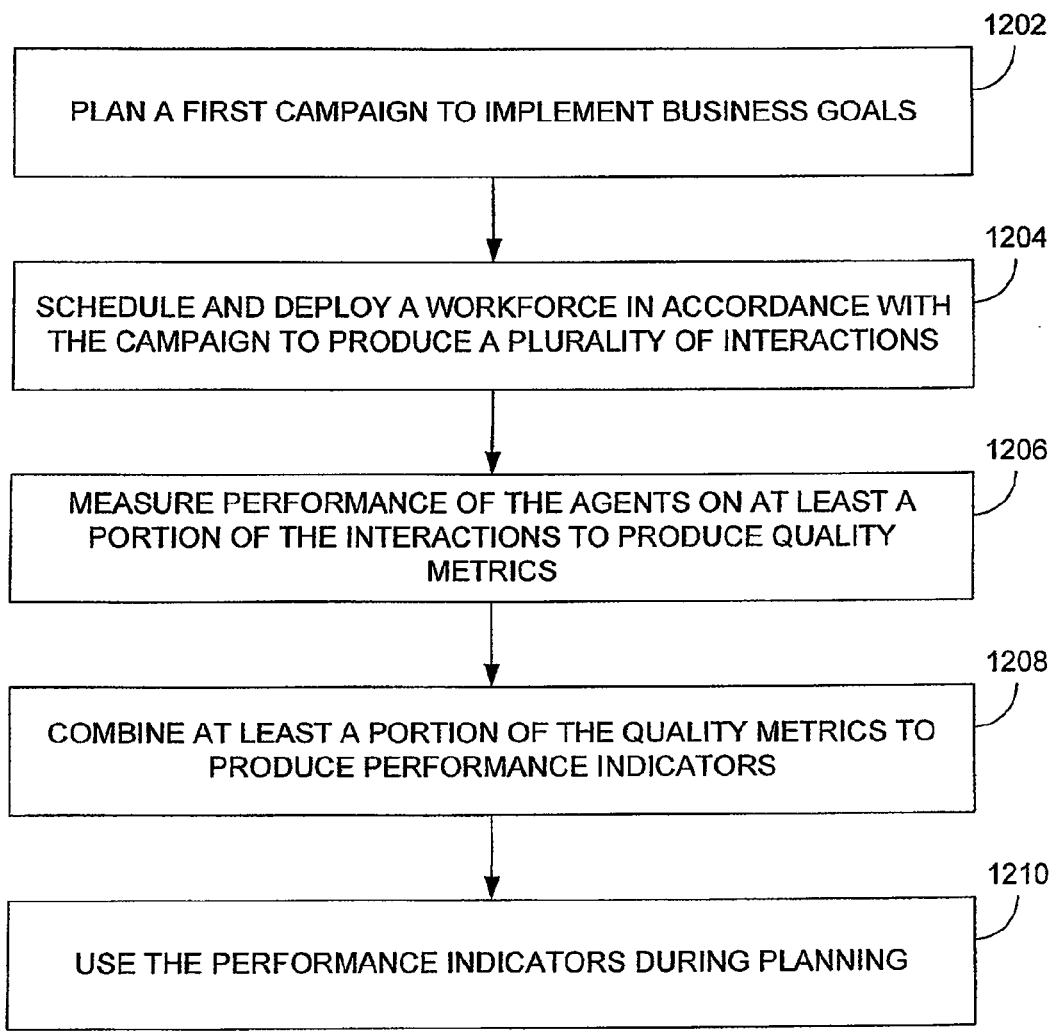

SYSTEMS AND METHODS FOR PROVIDING WORKFORCE OPTIMIZATION TO BRANCH AND BACK OFFICES

CROSS REFERENCE TO RELATED APPLICATIONS

This application hereby claims the benefit of and priority to U.S. Provisional Patent Application 60/948,868, titled "SYSTEMS AND METHODS FOR PROVIDING WORKFORCE OPTIMIZATION TO BRANCH AND BACK OFFICES", filed on Jul. 10, 2007, and which is hereby incorporated by reference in its entirety. This application is also a Continuation-In-Part application claiming the benefit of and priority to U.S. patent application entitled "Systems and Methods for Facilitating Contact Center Coaching", Ser. No. 11/540,185, filed on Sep. 29, 2006, which is a Continuation-In-Part application claiming the benefit of and priority to U.S. patent application entitled "Systems and Methods for Workforce Optimization and Integration", Ser. No. 11/359,356, filed on Feb. 22, 2006, each of which is incorporated by reference herein.

TECHNICAL FIELD

The present disclosure relates to workforce optimization.

DESCRIPTION OF THE RELATED ART

The business of a contact center is to provide rapid and efficient interaction between agents and customers (or prospective customers). Existing solutions require the purchase of multiple hardware and software components, typically from different vendors, to achieve the business goals of the contact center. The use of separate systems of components leads to a variety of problems. For instance, each system typically has its own method of configuration and its own user interface. Thus, exchanging data between the systems requires additional work by someone at the contact center.

Furthermore, contact centers are continually tasked with striking a balance between service quality, efficiency, effectiveness, revenue generation, cost cutting, and profitability. As a result, today's contact center agents are charged with mastering multiple data sources and systems, delivering consistent service across customer touch points, up-selling, cross-selling, and saving at-risk customers, while winning new ones.

In contrast, back offices typically provide indirect customer contact, in that back office personnel support operations of a business. By way of example, back office personnel can provide workflow management and human resources services.

A branch office may be considered a hybrid of a contact center and a back office. In particular, a typical branch office may provide both direct and indirect customer support.

SUMMARY

Systems and methods for providing workforce optimization are provided. An exemplary embodiment of such a method comprises: planning a first campaign to implement business goals; scheduling and deploying a workforce in accordance with the campaign to produce a plurality of interactions, at least one of the interactions involving a customer and a first agent of a contact center, at least another of the interactions involving a customer and a second agent of a branch office or back office; measuring performance of the first agent and the second agent on at least a portion of the interactions to produce a set of quality metrics for the agents; combining at least a portion of quality metrics to produce performance indicators; and using the performance indicators in the planning step of a second campaign or another iteration of the first campaign.

An exemplary embodiment of such a system comprises a forecasting and scheduling component operative to schedule a workforce of agents to produce a plurality of interactions, a first of the agents being assigned to a contact center for interacting with customers and a second of the agents being assigned to a branch office or back office for interacting with customers, wherein at least a portion of tasks directed to agents of the contact center is designated by the forecasting and scheduling component for completion by an agent of either the branch office or the back office.

Another embodiment of a method for providing workforce optimization comprises redirecting a customer contact, which was directed to a customer contact center staffed by agents dedicated to interacting with customers, to a branch office or a back office such that an agent of the branch office or of the back office interacts with the customer associated with the customer contact instead of an agent of the contact center.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

FIGS. 11 and 12 are flowcharts that depict the functionality of embodiments of a system for providing workforce optimization.

DETAILED DESCRIPTION

Figure 1:
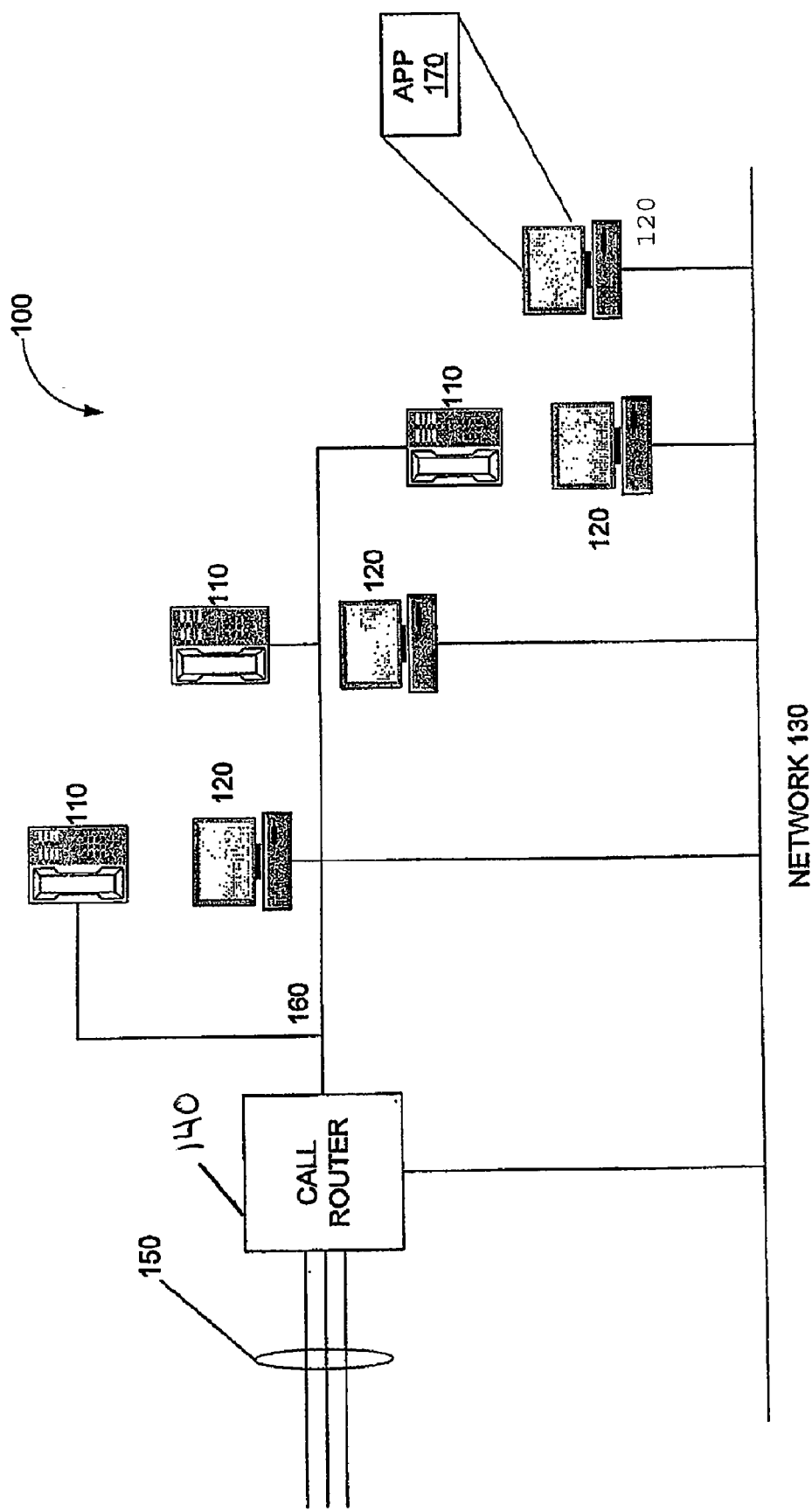
FIG. 1 is a block diagram of a contact center environment.

The systems and methods described herein provide integrated solutions for performing workforce management, quality monitoring, e-learning, performance management, analytics and/or coaching functionality. Combining at least some of the aforementioned functionality as a unified integrated solution, delivered through a single platform, enables users to gain more insight and make smarter decisions faster about sales, service and overall operations. Notably, this functionality can be used to integrate not only these functions in a contact center implementation, but can be used to integrate operations across contact center, back office and branch office configurations.

In this regard, some embodiments represent a convergence of at least some of six contact center technology segments that work together in support of a greater customer service strategy. In short, the integrated workforce optimization platforms disclosed herein can potentially integrate: (1) Quality Monitoring/Call Recording—voice of the customer; the complete customer experience across multimedia touch points; (2) Workforce Management—strategic forecasting and scheduling that drives efficiency and adherence, aids in planning, and helps facilitate optimum staffing and service levels; (3) Performance Management—key performance indicators (KPIs) and scorecards that analyze and help identify synergies, opportunities and improvement areas; (4) e-Learning—training, new information and protocol disseminated to staff, leveraging best practice customer interactions and delivering learning to support development; (5) Analytics—deliver insights from customer interactions to drive business performance; and/or (6) Coaching—identification of substandard performance, scheduling of supervisor intervention and training, agent feedback and report generation. These six segments can become part of an interwoven and interoperable solution, enabling operations to transition from reactive to proactive, information-rich departments that deliver strategic value to the organization.

Further, the integrated workforce optimization platforms disclosed herein provide closed-loop systems for continuous performance improvement, that enable an organization to: establish realistic forecasts and performance goals; schedule and deploy the right number of staff with the appropriate skills; capture customer interactions in their entirety by recording all calls, or recording based on business rules, or on-demand, or randomly; measure performance to identify execution issues and excellence; analyze customer interactions to investigate opportunities for optimizing use of people, processes and technologies; take action by delivering targeted coaching, training or re-engineering processes; and/or refine forecasts and performance goals based on the collected data.

Reference will now be made to several exemplary embodiments. With respect to branch and back office integration, however, many of the aspects relevant to these implementations are dedicated to a distinct section below.

One embodiment of the integrated process and system disclosed herein begins with planning and establishing goals—from both an enterprise and center perspective—to ensure alignment and objectives that complement and support one another. Next comes forecasting and scheduling of the workforce to ensure optimum service levels. Then recording and measuring performance are utilized, leveraging quality monitoring/call recording to assess service quality and the customer experience.

Next, the process/system analyzes and identifies opportunities and correlates them with the contact center or organization's KPIs and scorecards. Then, coaching, e-learning and company-specific "best practices" (documented through captured customer interactions) make it possible to address skill and knowledge gaps efficiently and effectively—as well as quickly communicate policy or procedural changes across the center—enabling the contact center to achieve success in whatever terms it chooses to define. Rather than arbitrarily sending e-learning training segments and hoping agents use them, organizations can use advanced workforce management forecasting and scheduling to select the best time to administer training (which is proven to be more effective than classroom or group learning) as well as free supervisors to work one-on-one with agents.

Quality monitoring scores, including insights from analytics and/or analytical analysis of structured, unstructured, or aggregated data, can next be fed into a workforce management to produce staffing models that prevent companies from unknowingly scheduling one shift with all the top performers, for example. As a result, some embodiments of the workforce management component of the process/system of the present invention can provide a higher level of consistent service across shifts.

As can be seen, while each technology segment delivers value, integration is the key: together the segments deliver greater impact than the sum of their individual parts. Utilizing them separately limits the contact center's potential to become a strategic business asset.

The integrated systems for workforce optimization disclosed herein potentially solve many deficiencies. For instance, at an operational level, organizations are focused on optimizing customer sales/service representative (CSR) performance. In the process, they may be working under constraints, such as cost control and infrastructures that provides only bare essentials. They may also face the challenge of matching demand with resources, retaining effective agents, prioritizing coaching/training, and delivering consistent customer experiences. Leveraging an integrated system and its components, such as forecasting and scheduling, voice/screen capture/recording, evaluations and best practice training, enables them to focus on reducing risk, decreasing average handle time, improving quality scores, driving down average time to answer, ensuring adherence and managing occupancy.

At a more advanced level, organizations are focused on optimizing performance. They face the challenge of balancing productivity with quality, increasing center-driven revenue, standardizing service across touch points, and growing transaction complexities. Organizations are examining such metrics as first call resolution, shrinkage, up-selling and cross-selling, and customer satisfaction as driven though the contact center. As disclosed herein, the forecasting and scheduling, adherence, business rules-driven recording, lesson management, and agent/organizational scorecard functionality—for example—unites contact center experiences, provides flexible scheduling, and promotes the initiation of a performance improvement culture.

The subject matter disclosed herein is related to the subject matter disclosed in several pending U.S. patent applications. One is entitled "Enterprise Manager for Recorders from a Central Point of Administration," Ser. No. 11/359,325, filed Feb. 22, 2006, and entirely incorporated by reference herein. The subject matter of the 1180 application is centralized administration of voice, video, and data recorders, and enabling role-based access control of recorders which do not have role-based security concepts.

Another is "Systems and Methods for Scheduling Call Center Agents using Quality Data," Ser. No. 11,359,909, filed Feb. 22, 2006, and entirely incorporated by reference herein.

Another is "Systems and Methods for Scheduling Call Center Agents using Quality Data and Correlation-Based Discovery," Ser. No. 11/359,731, filed Feb. 22, 2006, and entirely incorporated by reference herein.

Another is "System and Method for Integrating Learning Systems and Scorecards Systems", Ser. No. 11/359,359, filed Feb. 22, 2006, and entirely incorporated by reference herein.

Another is "System and Method for Integrating Learning Systems and Workforce Management Systems", Ser. No. 11/359,194, filed Feb. 22, 2006, and entirely incorporated by reference herein.

Another is U.S. application Ser. No. 10/136,705, entitled "Method and System for Presenting Events Associated with Recorded Data Exchanged between a Server and a User," and entirely incorporated by reference herein. The subject matter of the '705 application includes capturing and graphically displaying events that occur during an interaction between a customer and an agent. A reviewer is presented with a summarized voice interaction session, in the form of a call timeline, including a list of event identifiers. The reviewer selects one of the event identifiers in the timeline, and the interaction session, starting with the selected event, is presented to the user. The user could choose to start listening to the exchange at an event by selecting the event.

Another is U.S. application Ser. No. 10/137,480, entitled "Method and System for Selectively Dedicating Resources for Recording Data Exchanged between Entities Attached to a Network," filed on Apr. 30, 2002, and entirely incorporated by reference herein. The subject matter of the '480 application includes determining whether to use an active tap or a passive tap to record data passing through a particular node based upon an objective for recording as noted by predefined business rules.

Another is U.S. Ser. No. 10/136,735, entitled "Methods and Systems for Categorizing and Cataloguing Recorded Interactions," filed on Apr. 30, 2002, and entirely incorporated by reference herein. The subject matter of the '735 application includes categorizing data upon storing the captured data. The categories are based upon predefined business rules for storing captured data.

Another is U.S. application Ser. No. 10/061,469, entitled "Method, Apparatus, and System for Capturing Data Exchanged between a Server and a User," filed on Jan. 31, 2002, and entirely incorporated by reference herein. The subject matter of the '469 application includes capture of exchange data by a capture module that operates independently from the server and the user.

Another is U.S. application Ser. No. 10/061,489, entitled "Method, Apparatus, and System for Processing Data Captured during Exchanges between a Server and a User," filed on Jan. 31, 2002, and entirely incorporated by reference herein. The subject matter of the '489 application includes selective recordation of captured data based upon whether the data satisfies predetermined business rules.

Another is U.S. application Ser. No. 10/061,491, entitled "Method, apparatus, and system for replaying data selected from among data captured during exchanges between a server and a user," filed on Jan. 31, 2002, and entirely incorporated by reference herein. The subject matter of the '491 application includes replaying data captured during a session, wherein search criteria are based upon business rules.

The following is a list of other U.S. utility applications which may include related subject matter, each of which is incorporated by reference: U.S. utility application, entitled, "Method and Apparatus for Long-Range Planning," having Ser. No. 09/899,895, filed Oct. 3, 2002; U.S. utility application entitled, "Interface System and Method of Building Rules and Constraints For a Resource Scheduling System," having Ser. No. 09/680,131, filed Oct. 2, 2000; U.S. Utility Application entitled, "System and Method for Complex Schedule Generation," having Ser. No. 09/825,589, filed Apr. 3, 2001; U.S. utility application entitled, "Method and Apparatus for Long-Range Planning," having Ser. No. 09/899,895, filed Jul. 5, 2001; U.S. utility application entitled, "Method and Apparatus for Multi-Contact Scheduling," having Ser. No. 11/037,604, filed Jan. 18, 2005; and U.S. Utility application entitled, "Method and Apparatus for Concurrent Error Identification in Resource Scheduling," having Ser. No. 11/237,456, filed Sep. 27, 2005.

Contact Center Environment

FIG. 1 is a block diagram of a contact center environment 100. The contact center 100 is staffed by agents who handle incoming and/or outgoing contacts. Although the traditional and most common form of contact is by phone, other types of contacts are becoming more common (e.g., text chat, web collaboration, email, and fax). An agent workspace includes an agent phone 110 and a workstation computer 120. A network 130 connects one or more of the workstations 120.

A call router 140 distributes incoming contacts to available agents. When the contacts are made by traditional phone lines, the call router 140 operates by connecting outside trunk lines 150 to agent trunk lines 160. In this environment, the call router 140 may be implemented by an automatic call distributor (ACD), which queues calls until a suitable agent is available. Other types of contacts, such as Voice over Internet Protocol (VoIP) calls and computer-based contacts (e.g., chat, email) are routed over one or more data networks. These contacts are distributed over network 130 to one of the agent workstations 120.

During a customer contact, the agent interacts with one or more applications 170 running on the workstation 120. Example workstation applications give the agent access to customer records, product information, ordering status, and transaction history, for example.

The business purpose of a contact center is to provide rapid and efficient interaction between agents and customers. To achieve this purpose, a contact center follows a business process having stages, in that one stage affects subsequent stages.

In a conventional contact center business process, there is a relatively high degree of separation between stages. In contrast, in the integrated contact center business process 200 (FIG. 2) described here, multiple stages are connected into a loop, with each stage of the process feeding input into another stage down the line.

Figure 2:
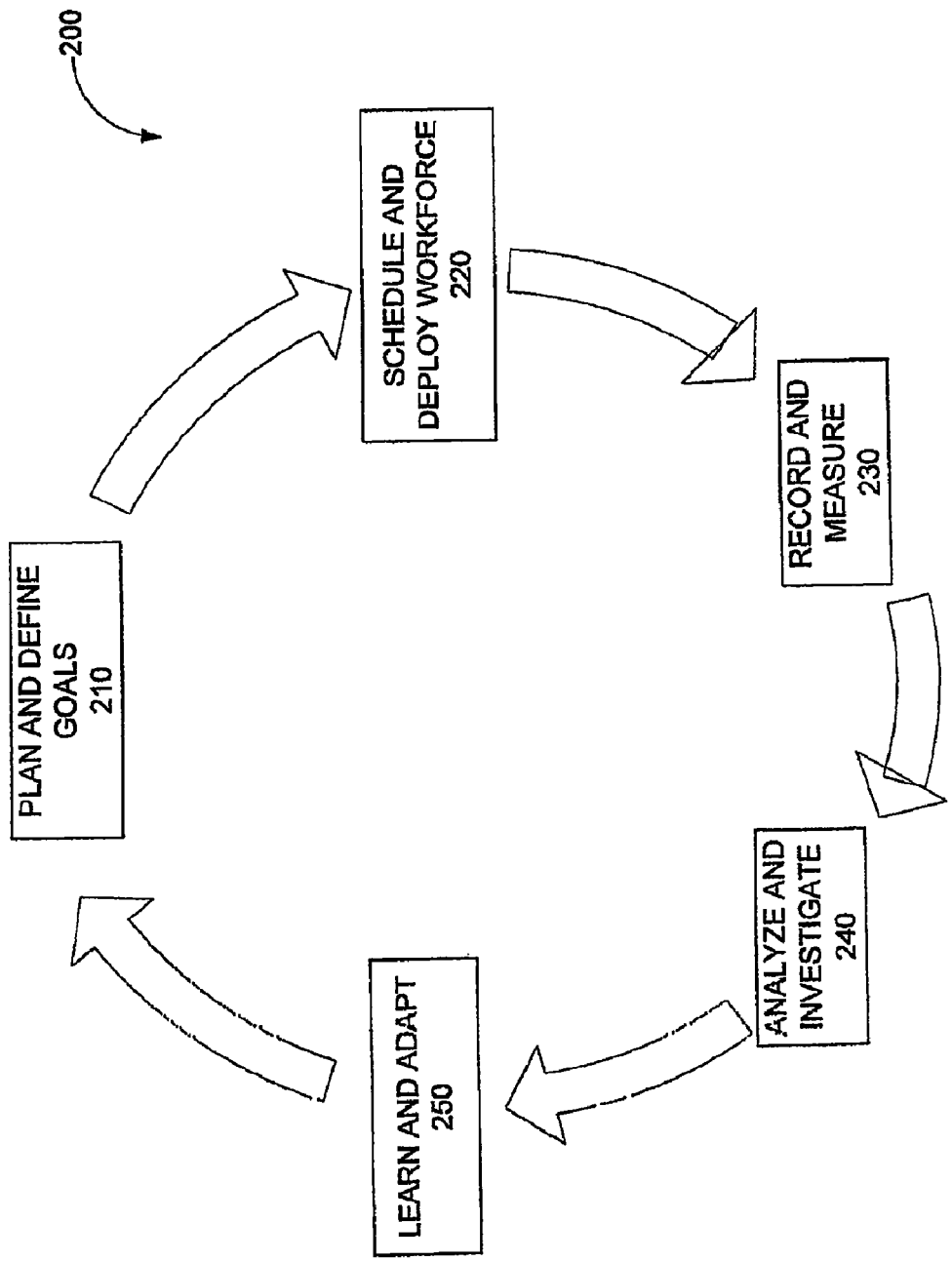
FIG. 2 is a diagram of one embodiment of the integrated process for optimizing operations at a contact center.

FIG. 2 is a diagram of an embodiment of the integrated process for optimizing operations at a contact center (200), in which several interfaced organizations are combined as a single integrated operational process and/or platform. In the first stage (210), the business goals of the contact center are defined. Goals are defined in terms of metrics that describe how the contact center is expected to perform. Some metrics relate to expected revenue, such as revenue/hour or revenue/agent. Other metrics relate to service level, such as time-to-answer and rate of first-call resolution. Persons familiar with contact center operations will understand these and many other business goals and metrics.

The first stage (210) may also include campaign planning. Profiles for campaigns are defined, for example, by inbound or outbound, how many contacts are expected, date and duration of the campaign, and what sorts of agent skills are needed.

Information about the goals and campaign(s) produced by the first stage (210) is provided to the second stage (220). In the second stage (220), a workforce of agents is scheduled to staff the campaign(s). In determining the number of agents scheduled for a campaign, the goals/metrics and campaign characteristics from the first stage (210) are considered. The schedule also uses as input a workload forecast, which predicts contact volume during each interval of the campaign, based on historical data. Using this schedule, the contact center manager deploys the appropriate number and mix of agents during the campaign times.

The output of the second stage (220) is the customer-agent interactions that occur during a campaign. The third stage (230) measures or assesses the interactions in various ways. One typical assessment ("adherence") measures how well an agent complies with contact center policies (e.g., call duration). In the third stage (230), at least a portion of the interactions are recorded and then examined. This examination produces a variety of quality metrics that assess an agent's skills in various categories (product knowledge, selling, listening, etc.)

The various assessments are provided as input to the fourth stage (240). In this stage, these inputs are analyzed in various ways. The analysis may rate interactions on a "good" to "bad" scale, considering the customer point of view, the business point-of-view, or both. For example, a contact that resulted in a sale would be an indicator of a "good" interaction while a contact that exceeded average duration would be an indicator of a "bad" interaction.

Once "bad" interactions are identified, an attempt is made to determine a root cause. In some cases, the root cause may lie with an agent (e.g., weak product skills). In other cases, the cause may be in the contact center infrastructure or operations (e.g., customer database is slow). The cause might also be rooted in a business process of the enterprise that is sponsoring the campaign. For example, the billing process used by the enterprise, or the process by which the enterprise dispatches field service units could be the cause.

The fifth stage (250) uses the analysis produced by the fourth stage (230) to adapt and change operations accordingly. Agent skills can be improved by training in the deficient areas. The information may be used to change an aspect of contact center operations, or to make a recommendation to the sponsoring enterprise for it to change its processes or operations. The results of the analysis, as well as the raw metrics used as input to the analysis, are combined into data sets ("scorecards") that allow the contact center operators to determine whether or not the business goals are met and whether the metrics show progress toward the goals or away from the goal ("trending"). These data sets are provided as input to the first stage (210), which closes the feedback loop of the integrated contact center business process 200.

Figure 3:
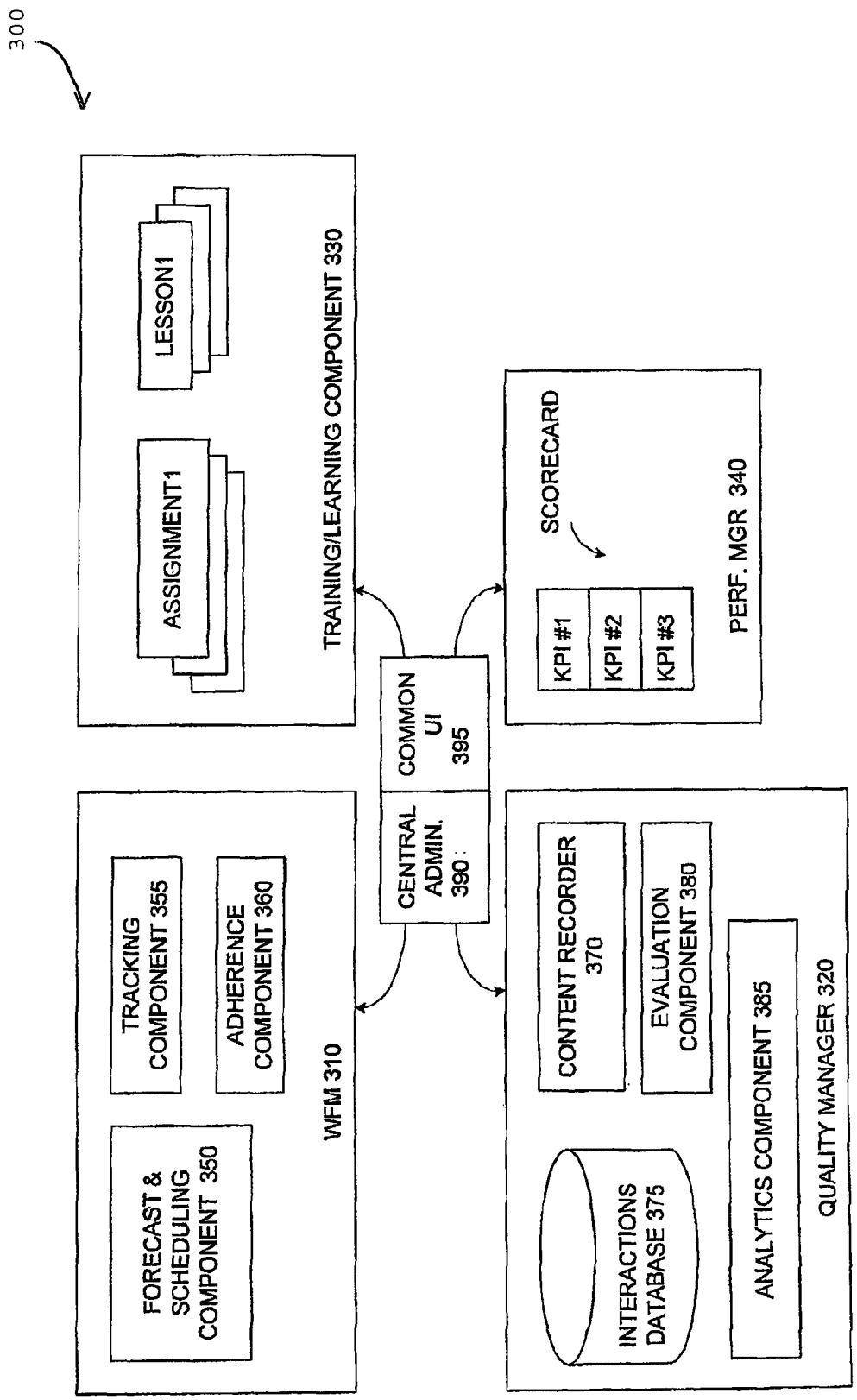
FIG. 3 is a high-level view of components in one embodiment of an integrated contact center system.

FIG. 3 is a high-level view of components in an embodiment of an integrated contact center system 300. The integrated system 300 includes two or more of the following components: a work force manager (WFM) 310; a quality monitoring component 320 (also herein "quality manager"); a learning component 330; and a performance management component 340 (also herein "performance manager"). These components (310-340) cooperate to implement the integrated contact center business process (200) as described earlier.

As will be described, combining agent quality metrics from the quality monitor 320 (e.g., synchronous such as voice, asynchronous such as e-mail or chat) with WFM 310 (e.g., agent planning, scheduling) may provide insight that contact center supervisors can use to confirm the value provided by agents to the business as a whole.

The WFM 310 performs many functions related to the agent workforce. For example, WFM 310 can: schedule single, multiple, or virtual contact centers across multiple time zones; accommodate a dedicated, blended, or task-switching environment; schedule meetings or training without impact on service levels; allow agents to bid for shifts and provide input into their schedules; automate compliance with government and union regulations; create centralized forecasts and schedules with a single point of control over the entire network, or decentralized schedules that allow for decision-making at individual sites; schedule based on skill priorities that align with the contact center's routing strategy; and create and schedule teams as a unit to support training and accommodate employee preferences.

The functionality of the entire WFM 310 is typically divided among several applications, executables, processes, or services. A forecast and scheduling component (350) calculates staffing levels and agent schedules based on historical interaction (contact) patterns. A tracking component (355) provides a contact center supervisor or manager with information about agent activities and agent-customer interactions, both historical and real-time. An adherence component (360) supplies the supervisor with information on how well each agent complies with call center policies. For example, once schedules are created, the contact center should ensure that agents follow the schedules.

Most preferably, the adherence component 360 provides a real-time view of every activity across each channel in the contact center, including those in the front and back office, so supervisors/contact centers can see how their staff spends its time. In an enhancement, alerts can be set to notify supervisors when agents are out-of-adherence and exception management can help ensure agents are correctly recognized for work they have performed.

The quality monitor 320 includes a content recorder (370) for recording agent-customer interactions. The content recorder 370 can be configured to capture all interactions, or a selected set of interactions based on user-defined business rules.

The content recorder 370 can capture voice and data interactions from both traditional and IP telephony environments and can handle high-volume recording for compliance and sales verification. The content recorder 370 can also record all voice transactions across multiple sites, or randomly capture a subset of transactions that may be of particular interest, as well as record contacts on-demand. Using the content recorder 370 a user can record all contacts or establish advanced business rules to capture only those transactions of particular interest. User-defined business rules can trigger the recordings, initiate enterprise collaboration by notifying individuals or groups of the captured contacts and emerging trends, and allow users to assign attributes or "tags" to the contacts for quick identification. All data related to a customer interaction—including navigation of automated systems, agent keystrokes and desktop activities—can be stored automatically in folders for search and retrieval. Different users in an enterprise can share and review transactions, as well as hear customer feedback first-hand.

The quality manager 320 stores the interactions in an interactions database 375, which may include descriptive information as well as recorded content. Contact center personnel play back some of the interactions and use an evaluation component (380) to score the agent in various categories (product knowledge, selling, listening, etc.)

Furthermore, contact center supervisors and quality analysts can then tap into these recorded interactions to review, evaluate, and score agent performance. An analytics component (385) can analyze interactions in various ways, including the use of speech analytics. Examples of analysis include categorizing calls based on content, analyzing a call against an expected call pattern and reporting exceptions to the pattern, and providing a visualization layer for recorded interactions that displays other data attributes such as agent activities coincident with call events.

The learning component 330 allows a contact center manager to develop training lessons for agents and assign lessons to agents. The learning component 330 provides automated training processes by identifying, scheduling, and delivering online learning directly to agent desktops. The lesson content can include recorded interactions, which can be used to create a library of best practices for training agents and other personnel. Using actual interactions, a contact center can develop E-learning content specific to the organization. In an enhancement, these training lessons can include assessments to help track and measure agent performance, skill acquisition, and knowledge retention.

The learning component 330 can also deliver targeted learning sessions over a network, using e-mail, or a hyperlink to a Web site, or directly to the agent desktop. Supervisors can select the appropriate training sessions from a library of courseware or create sessions themselves using a contact-editing feature. Then supervisors can assign course material and monitor completion automatically.

The performance manager 340 displays key performance indicators (KPIs), which can be predefined on a scorecard. The scorecard, which can be role-appropriate, provides a statistical measure of how well an agent or group of agents is performing (against their goals). The KPI metrics are derived from quality evaluations and/or WFM call routing data.

A centralized administration component 390 consolidates agent administration across the various components into a single point of entry, and provides a single logon to all components for agents and administrators. The administration component 390 may also include a centralized reporting component, even across multiple sites. A consistent user interface 395 reduces training time on the various system components.

An integrated contact center system such as system 300 allows contact center analysts to quickly access the right information. Such an integrated system allows valuable and previously undiscovered information to be uncovered. This new level of visibility into contact center operations should allow personnel to make better decisions faster.

Figure 4:
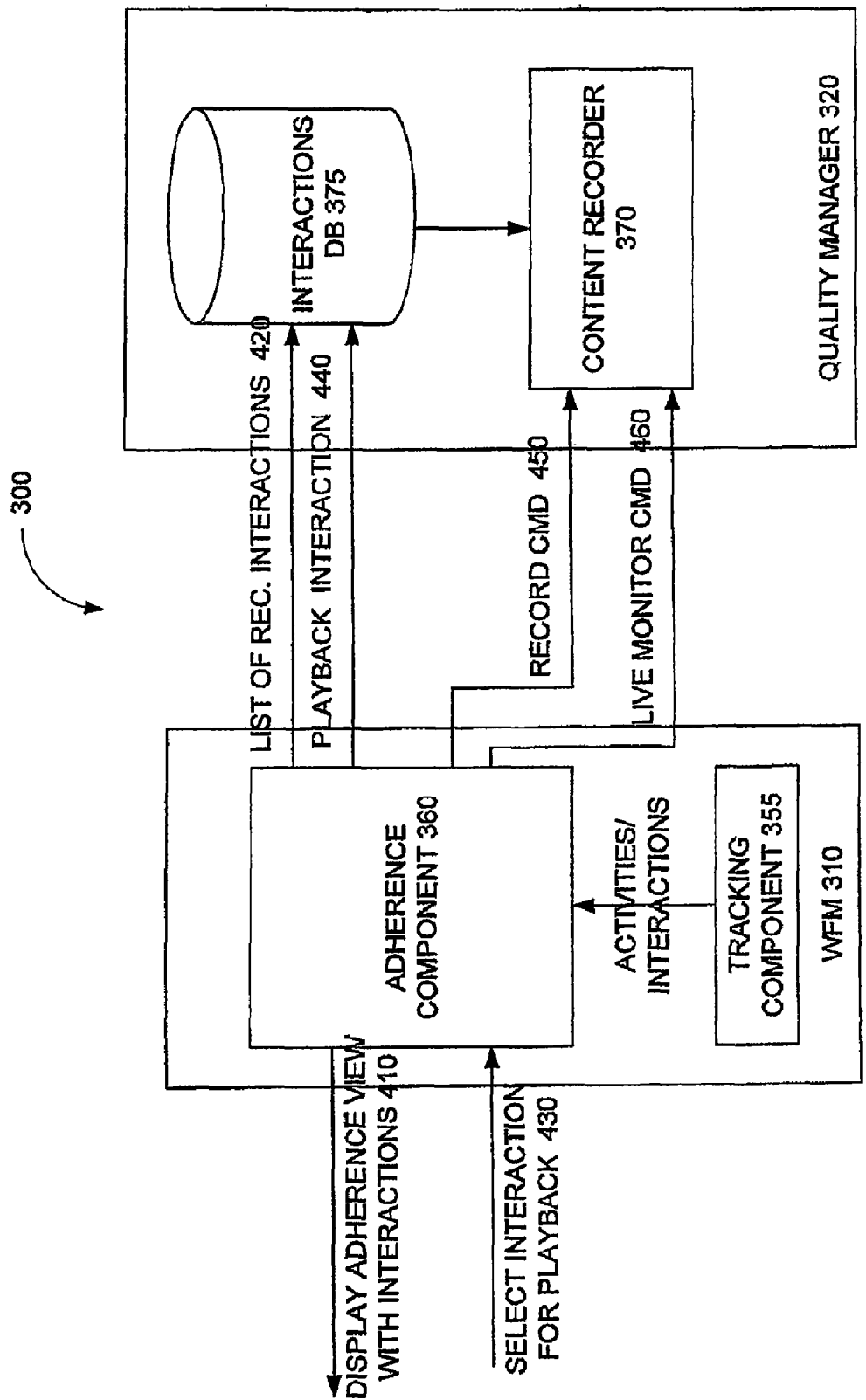
FIG. 4 shows a point of integration between the work force manager (WFM) and the quality monitor of FIG. 3.

FIG. 4 shows a point of integration between two components of the integrated contact center system 300, for instance the WFM 310 and the quality monitor 320. Conventional call center systems provide an "interactions" application that allows playback of recorded interactions and live monitoring of interactions. Importantly, these conventional systems did not integrate interactions with WFM adherence information. The integration between the WFM 310 and the quality monitor 320 described in FIG. 4 allows a supervisor to "drill down" and examine a particular recorded interaction from a display of agent activity and/or adherence information.

In this disclosure, the term "interaction" refers to a record of the content of agent activities related to a call. Note that agent activities are not limited to audio of the call itself. Other forms of media are included. Examples of other types of interactions are: video recording of the agent; application activity on the agent's workstation 120; web pages delivered to the agent and/or customer during collaborative sessions; messages delivered through e-mail, instant messaging, or other messaging technologies. Also, the agent activities in an interaction are not limited to the duration of the call, but can occur after the call (a state called "wrap up" or "research").

The tracking component 355 of the WFM 310 provides information about agent activities to the WFM adherence component 360. Agent activities, which describe work activities performed by agents, are collected from various sources. The call router 140 (FIG. 1) reports agent call states (Available, After-Call-Work, etc.). An application monitor on agent workstation 120 tracks agent activity on the workstation (e.g., switching between applications, screen data, keyboard input, etc.).

The adherence component 360 displays a view (410) of agent activities, typically one agent per line, with activities arranged across a timeline. Exceptions to agent adherence (e.g., non-compliance with contact center policy) are displayed in conjunction with the activities and the timeline.

The adherence component 360 obtains a list (420) of recorded interactions available for agents during the displayed time period. This list of interactions is presented to the user in the same adherence view (410).

From this adherence view, a user can "drill down" to a recorded interaction by selecting (430) the interaction from the list, and then activating a playback tool. The adherence component 360 retrieves (440) the selected interaction from the interactions database 375, and the interaction is then played back using an appropriate application (e.g. media player, desktop activity player, web content player). A user can also select an agent activity that is presently occurring and either record on demand (450) or live monitor (460) the selected activity.

Integration between the WFM 310 and the quality monitor 320 is further described in the U.S. patent application "System and Method for Integrated Display of Recorded Interactions and Call Agent Data," Appl. Ser. No. 11/359,357, filed Feb. 22, 2006 by the same assignee as the instant application.

Figure 5:
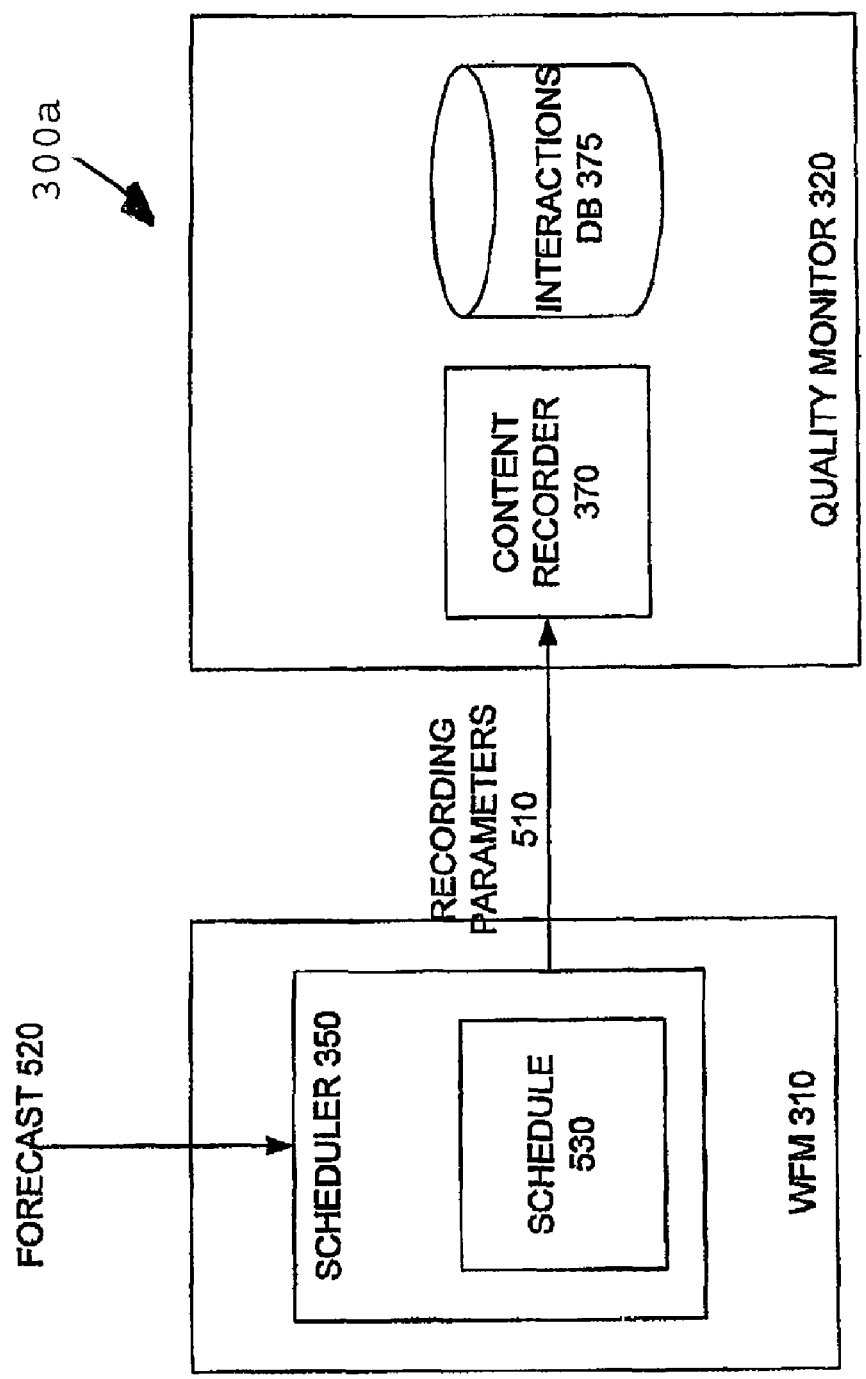
FIG. 5 shows another point of integration between the work force manager (WFM) and the quality monitor of FIG. 3.

FIG. 5 shows an additional point of integration between the WFM 310 and the quality monitor 320, in which agent activity, adherence, and/or scheduling information is used to trigger selective recording in a selective recording environment, or to perform smart selection of recording for evaluation in a total recording environment. In a conventional quality monitor 320, the content recorder 370 can be configured to record a certain number, or percentage, of agent-customer interactions. This parameter is typically fixed for the duration of a campaign, though it can vary from one campaign to the next.

In the integrated system 300a, the WFM 310 generates call recording parameters 510 based on information contained in the forecast 520 (e.g., call volume and call type) and/or the schedule 530. The recording parameters 510 are provided to the content recorder 370 in the quality monitor 320. This integration allows the content recorder 370 to adapt recording behavior during a campaign.

As an example of how this feature is useful to a contact center, consider a marketing campaign that starts on a Monday and lasts all week. It is expected that call quality for agents on this campaign will be relatively low on Monday, since the material is new to the agents. By the end of the week, the agents are more familiar with the material, so that agent quality scores are expected to increase.

The recording parameters 510 provided to the content recorder 370 in the integrated system 300a allow a contact center manager to increase the percentage of interactions recorded at the start of the campaign, and to reduce the percentage as the campaign progresses. Recording parameters 510 can be further associated with one agent, or a set of agents, so that inexperienced agents (e.g., agents with low scores) have a higher percentage of recorded interactions as compared to more experienced agents.

Other examples of using WFM data to determine recording behavior include: trigger or select recording based on relative elapsed time from the beginning of the shift; trigger or select recording before or after specific activities (e.g., after lunch or before break activity); and trigger or select recording based on adherence data (e.g., agent is on call but not adhering to schedule).

Figure 6:
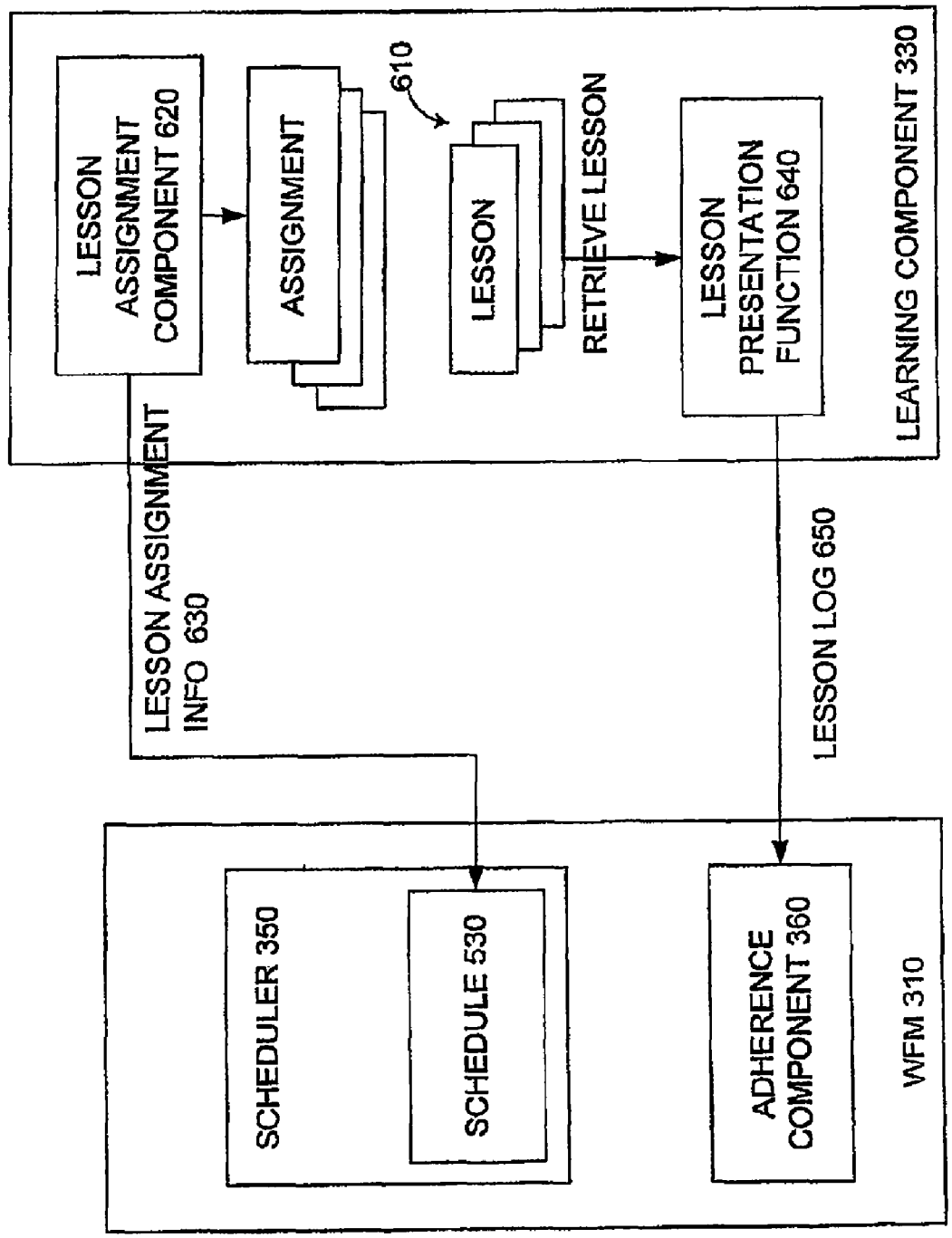
FIG. 6 shows several points of integration between the WFM and the learning component of FIG. 3.

FIG. 6 shows several points of integration between the WFM 310 and the learning component 330. The learning component 330 includes lessons 610. Each lesson 610 is designed to improve an agent's competence in a particular area. Lessons are assigned, either manually or automatically, through a lesson assignment component 620, which communicates information about the assignment (630) to the scheduler 350 in the WFM 310. In one embodiment, the information 630 includes an agent identifier, a lesson identifier, a lesson duration, and a lesson completion date. After receiving the lesson assignment information 630, the scheduler 350 modifies the schedule 530 to include a training activity for the identified agent. If possible, the new training activity is scheduled before the lesson completion date.

An agent receives training through a lesson presentation function 640. The presentation may take the form of viewing a video and/or listening to audio on the agent workstation 120. The lesson presentation function 640 maintains a lesson log 650, which tracks the presentation of lessons 610 to agents. In one implementation the lesson log 650 includes an agent identifier, a lesson identifier, the time when the lesson presentation began, and an indication of whether the lesson has been completed.

In yet another point of integration between WFM 310 and the learning component 330, the lesson log 650 is provided to the adherence component 360 in the WFM 310. The adherence component 360 uses information in the lesson log 650 to determine whether an agent has met the lesson completion date. If not, the adherence component 360 notes the incomplete lesson as an exception to adherence.

Scheduling assigned lessons and tracking adherence to these assignments is further described in the U.S. patent application "Tracking of Lesson Adherence in a Call Center Environment," Ser. No. 11/359,194, filed on Feb. 22, 2006 by the same assignee as the instant application.

Figure 7:
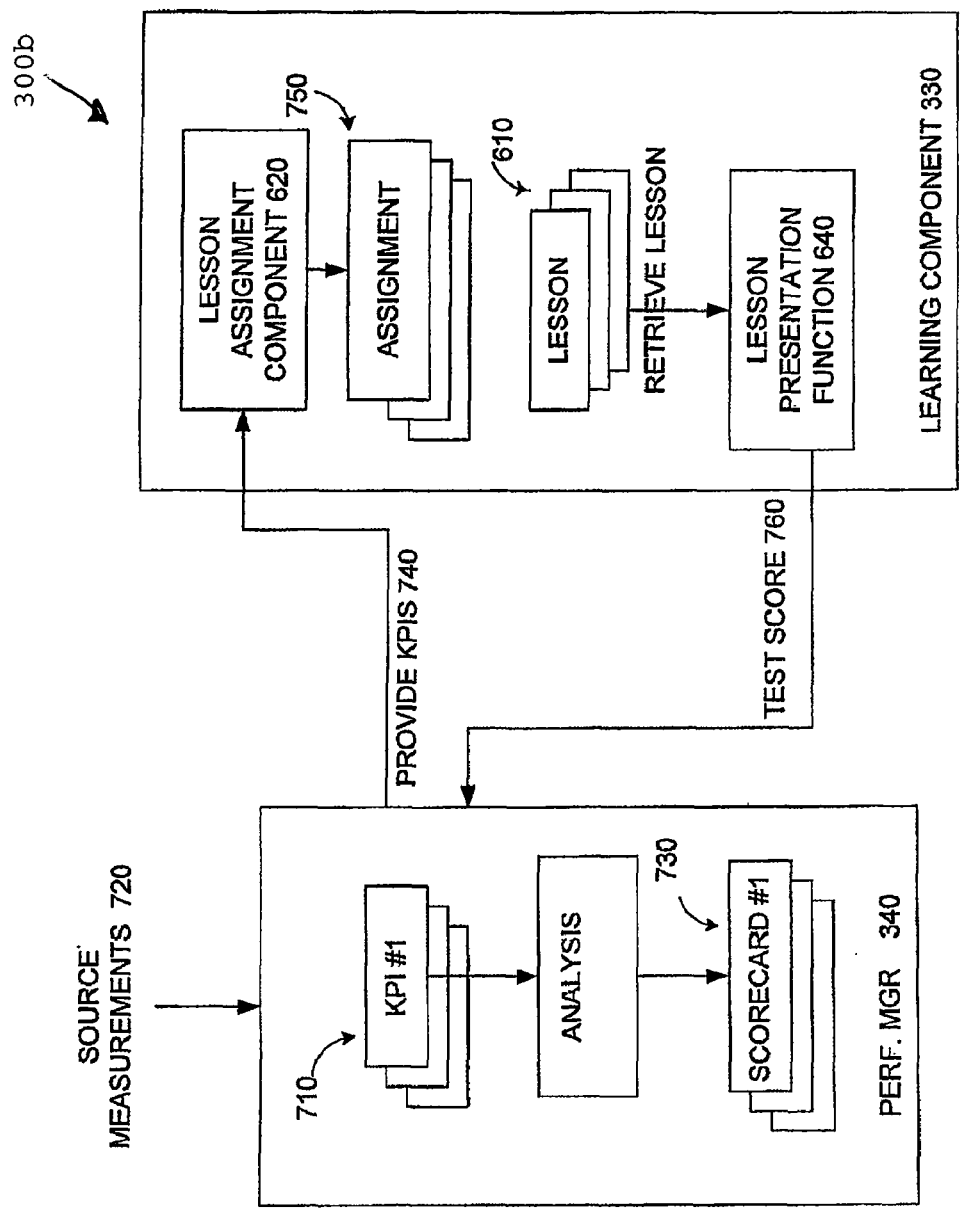
FIG. 7 shows several points of integration between the performance manager and the learning component of FIG. 3.

FIG. 7 shows several points of integration between the performance manager 340 and the learning component 330. The performance manager 340 maintains more key performance indicators (KPIs) 710 that measure how well an agent or group of agents is performing. The KPIs 710 may be based one or more source measurements 720, such as evaluations from the quality monitor 320 and call statistics from call router 140 (e.g., call duration, hold time during call, etc.)

The performance manager 340 does analysis on the KPIs 710 and/or the source measurements 720 to produce scorecards 730. The analysis may include calculating statistics such as average, variation, etc., aggregating by time period or groups of agents, and determining trends. The scorecards 730 are then presented in visual form to a user. Examples of scorecards are a daily scorecard for an agent or a team, and a scorecard of all agents for the past month.

In the integrated system 300b, the KPIs 710 are also provided (740) to the learning component 330. As described earlier, the learning component 330 maintains lessons 610, which can be assigned to an agent for review. In the integrated system 300b, each lesson 610 is associated with one or more KPIs 710. The lesson assignment component 620 examines one or more of the KPIs 710 for a particular agent, and makes an assignment (750) for a lesson 610 associated with that KPI 710, based on criteria associated with a KPI or a competency. In one implementation, the criteria is a comparison of one or more KPIs 710 for an agent to threshold values, and the lesson assignment component 620 assigns a lesson 610 if the KPI 710 is lower than the threshold. This point of integration therefore allows automatic lesson assignment based on KPI 710.

Automatic lesson assignment is further described in the U.S. patent application "Integration of E-Learning and Scorecards in Call Center Operation," Appl. Ser. No. 11/359,359, filed Feb. 22, 2006 by the same assignee as the instant application.

The presentation may also include a test that is given to the agent to determine competency in the area associated with the lesson 610. In yet another point of integration between WFM 310 and the learning component 330, the agent test score 760 for an agent is provided to the performance manager 340. The performance manager 340 updates the KPIs 710 to reflect the agent competency described by the test score 760.

Figure 8:
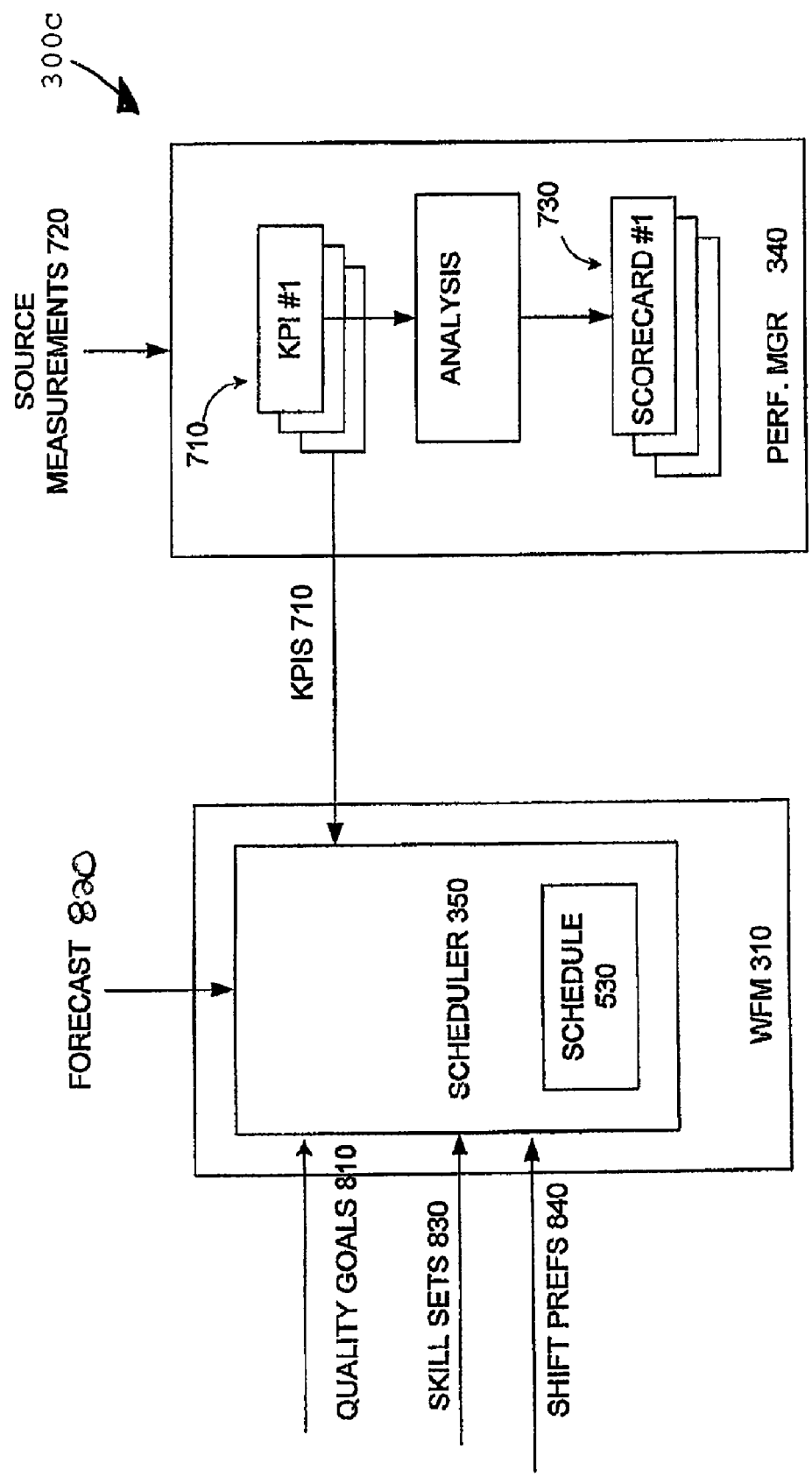
FIG. 8 shows a point of integration between the WFM and the performance manager of FIG. 3.

FIG. 8 shows a point of integration between the WFM 310 and the performance manager 340. Conventional schedulers allow agents to set preferences for shift assignments (e.g., one agent prefers to work weekends and another prefers to work nights). Since most agents are expected to prefer a day shift rather than a midnight shift, shift preferences are typically combined with agent ranking or seniority, so that someone works the midnight shift. This leads to a situation where the midnight shift is staffed with all of the "worst" agents.

As described earlier, the performance manager 340 maintains KPIs 710 that measure agent and/or group performance. In the integrated system 300c shown in FIG. 8, the scheduler 350 considers agent KPIs 710 when scheduling, so that some "good" agents are also added to the shift. The KPI 710 may reflect, for example, an evaluation of the agent's performance on a set of customer interactions. In one embodiment, the scoring is done by a human while playing back the recorded interaction. In another embodiment, the scoring is at least partly automated through the use of speech analytics.

The agent KPIs 710 are provided to the scheduler 350 in the WFM 310. Also provided to the scheduler 350 are quality goals 810 for a particular schedule interval. Examples of quality goals are "50% of agents have a score at of least 80" and "average score is at least 80."

The scheduler 350 considers the quality goals 810 and the KPIs 710, along with other inputs, to determine a schedule 530, which includes agent assignments to work activities at specific times. The scheduler 350 also considers other inputs, such as a workload forecast 820, agent skill sets 830 and agent shift preferences 840. The scheduler 350 then chooses a mix of agents to work a shift, so that the agent scores combine to meet the quality goals 810. Integration of KPIs and the scheduler is further described in the U.S. patent application "Systems and Methods for Scheduling Call Center Agents Using Quality Data," Ser. No. 11/359,731, filed Feb. 22, 2006 by the same assignee as the instant application.

Figure 9:
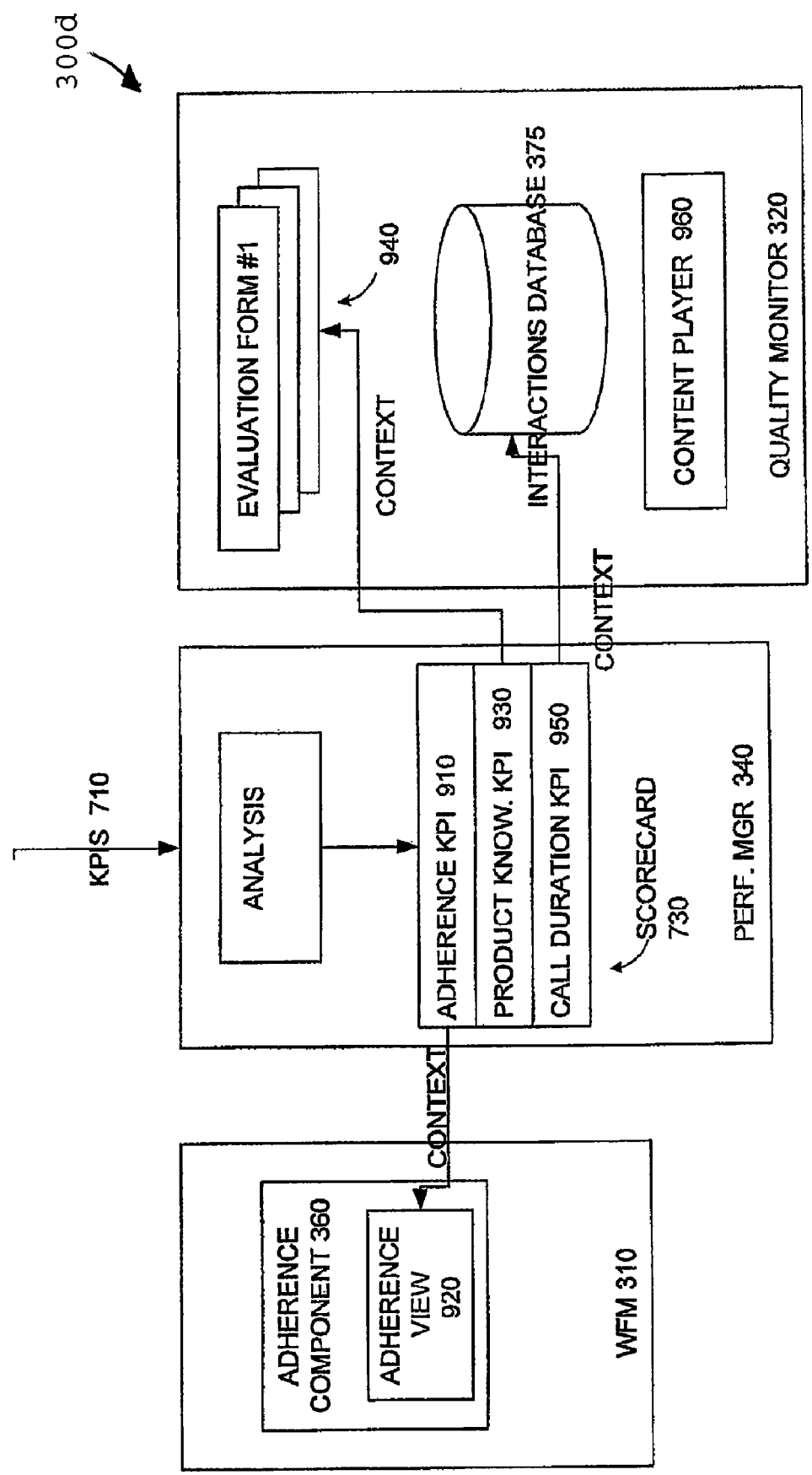
FIG. 9 shows another point of integration between the WFM and the performance manager of FIG. 3.

FIG. 9 shows another point of integration between the WFM 310 and the performance manager 340. As described earlier, the performance manager 340 maintains KPIs 710 that measure agent and/or group performance, and produces scorecards 730 from the KPIs 710. The scorecards 730 provide a quick way for a manager to determine areas that require attention. For example, if a particular agent is out of adherence or has a low competency score, then the adherence or competency KPI can be flagged with a warning icon. Typically, the manager wants more detailed information about the flagged problem area. A conventional contact center solution requires the manager to open up a particular application, such as Adherence or Quality Monitoring, to obtain detailed information about the problem area. Once in the application, the manager must then navigate to the root cause of the problem (e.g., the activity that was out of adherence).

In contrast, the integrated system 300d allows a user to quickly view details associated with the flagged problem area, in the appropriate application context. Several examples of this use of application context are shown in FIG. 9. When interacting with the performance manager 340, selecting an adherence-related KPI (910) in a scorecard 730 brings the user to a view (920) of adherence information. Furthermore, the particular agent activities that resulted in the out-of-adherence flag are highlighted or otherwise brought to the user's attention in the view 920. As another example, selecting a quality score-related KPI (930) (e.g., product knowledge KPI) brings the user to the quality monitor 320, and more specifically to the particular evaluation form 940 which contains the score 930.

As yet another example, selecting a call statistic-related KPI (950), such as call duration or hold time, brings the user to the quality monitor 320. The quality monitor 320 presents a list of recorded interactions (from the interactions database 375) which contributed to, or are in someway related to, the flagged call-statistic score 950. The user can then play back (960) one of the recorded interactions. The integrated system 300d thus greatly simplifies root cause analysis for contact center personnel.

Call recording and monitoring are vital to contact center operations and the business. Every day, insight and feedback on the organization are gained from customer interactions. Valuable business intelligence can be extracted from these calls to help call center executives improve operational efficiency, customer satisfaction, and profitability. Yet management can only listen to a small segment of recorded calls. Managers must search manually through an enormous number of calls just to find the calls they need to analyze. The process is not only inefficient and expensive, but valuable information is continually ignored, leaving only a small sample of data needed to make informed business decisions.

Figure 10:
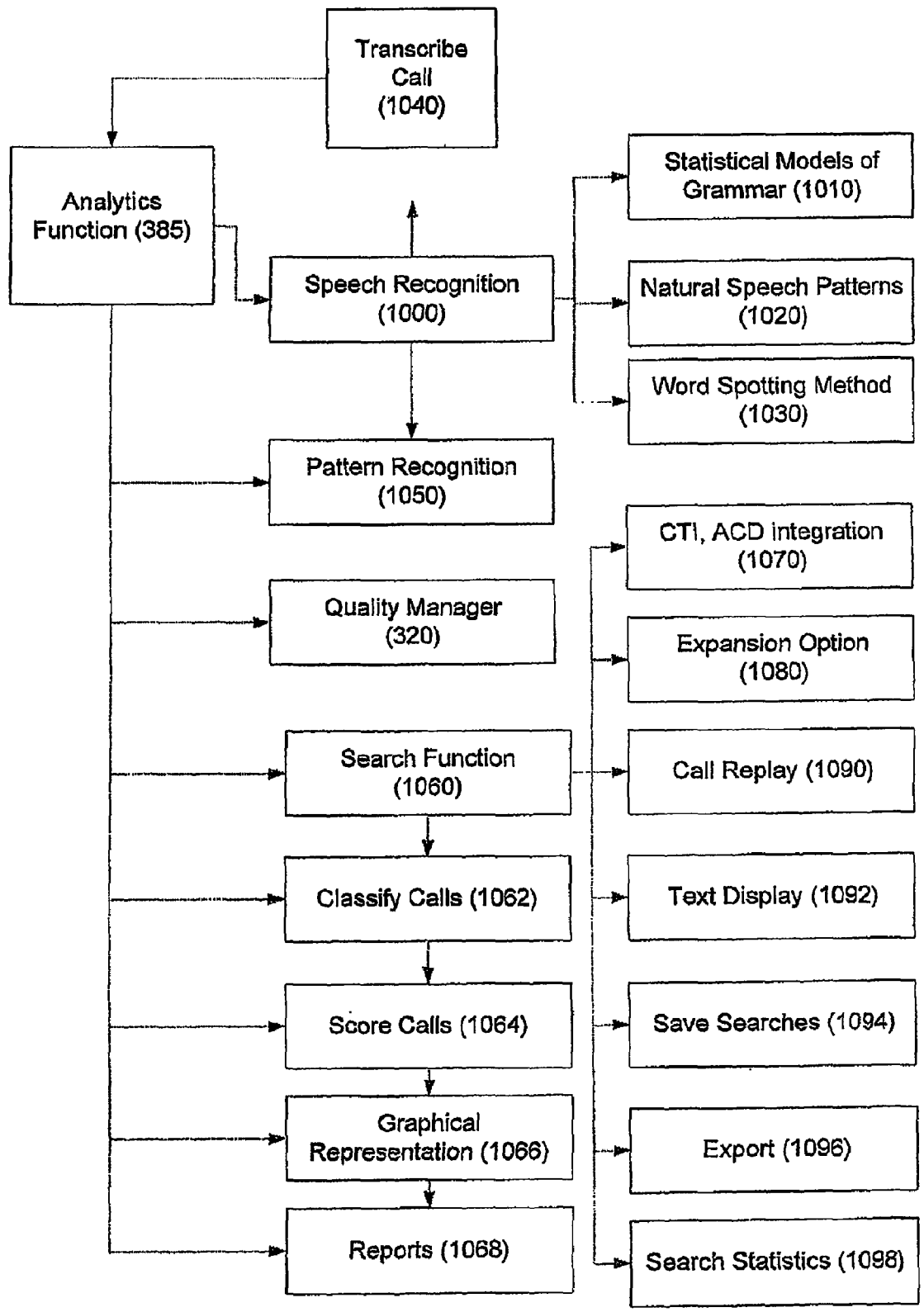
FIG. 10 shows components of the analytics function of FIG. 3.

Referring now to FIG. 10, with the analytics function 385 of the present invention (first introduced in FIG. 3), contact centers can now convert all call recordings into actionable business intelligence. Management can discern important competitive and business insight and easily identify trends from customer interactions, by analyzing speech, telephony, agent, and recording data together. In an enhancement, the analytics function 385 also streamlines the quality monitoring process by automatically classifying and scoring calls, based on selection criteria that may include any or part of the data captured by the integrated systems disclosed herein, including speech analytics.

The analytics function 385 of the present invention enables businesses to: (1) have a more accurate view of the customer experience, which allows executives across the organization to uncover critical customer attitudes, needs, and requirements; (2) automatically score and classify calls for easy retrieval and examination, which enables call centers to digitally score calls to conduct automated quality and customer satisfaction surveys; and (3) discover trends related to customer behavior (e.g. churn, product adoption) that impact the business.

The analytics function 385 preferably uses speech recognition 1000 to convert the recorded calls into a searchable repository that allows for the query of words and/or phrases contained within the recorded calls. This repository may manifest itself as a text transcript or searchable phonetic model of the recorded calls. The analytics function 385 may apply additional unstructured data analysis techniques to refine and extract the context and further meaning from the conversations. Examples of various techniques that may be applied to refine the context of the mined speech, or the speech-to-text conversion, include: statistical modeling of grammar using a statistical model of grammar 1010 module; and natural language processing using a natural speech patterns 1020 module. Further, the analytics function 385 identifies the critical words and phrases within the context of the conversation. All this enables the embodiments disclosed herein to capture the intent of the call, rather than merely the words of the call.

In an alternative embodiment, the analytics function 385 converts the audio of the conversation into a phonetic representation of the call and uses a word-spotting method 1030 (or a query analysis), which flags or tags calls by a specific word, phrase, proximity, inflection, tempo, or emotion. Queries may be performed on an ad-hoc basis or stored for pattern analysis.

With the recorded calls converted to searchable content (via a transcribed call 1040 represented in FIG. 10), the analytics function 385 allows users to look back in time to discover what customers have said. In the preferred embodiment, users do not need to know in advance what they are looking for. For example, if there was a spike in call volume last week, the analytics function 385 can enable the contact center to understand the reason for the increased calls. Also, the user can incorporate metadata obtained from telephony or CRM systems to gain further insight into the reasons for the call spike.

In an enhancement, the analytics function 385 also uses a pattern recognition module 1050 to pull meaning out of the results generated by speech recognition. The pattern recognition module 1050 discerns the call's pattern and automatically places the call into one or several categories once the call is ingested into the speech engine, based on the context the pattern recognition module 1050 is able to extract from the speech mining function. The patterns are used not only to classify calls but also to determine if a particular activity has occurred during the call, or to automatically score individual evaluation or survey questions based on this data. For instance a call score might be correlated to an existing evaluation or customer survey question during the call (e.g., "did the agent offer a cross sell", "did the agent remember to read the corporate policy"). By automating the labor-intensive quality monitoring processes, contact centers can realize not just a fast return on investment, but also deploy resources where they are strategic to the call center.

The analytics function 385 can link the call content to the metadata from, for example, a quality monitoring component (see FIG. 3), to relate characteristics such as agent ID, time/date, speaker's name, workgroup ID, and call routing. The analytics function 385 can link to custom data sources that may contain other information related to the agent/customer interaction, for example, a CRM system.

The analytics function 385 also includes a search function 1060. An append feature in the search function allows the user to modify the initial search by tacking on additional criteria and logic. A refine feature function allows the user to add to the search criteria, which are then used on the results of the last search. A remove feature allows the user to modify the initial search by tacking on additional criteria and logic. An undo allows any of the modifications just described to be reversed. In one enhancement, results from the initial search string using the search function 1060 can be refined to help focus on particular calls of interest. In another enhancement, users can combine the search functionality described above with data from the CTI, ACD and other sources via a CTI ACD integration 1070 module.

Different individuals use different words or phrases to depict a similar meaning. Recognizing this fact, the analytics function 385 enables users to expand single words into complete concepts, which convey intent and meaning, rather than being tied to one narrow possibility. An expansion option 1080 allows users to include plural, synonym, homonym, and containing words, in a single clean screen. For example, instead of searching for the single word "bill", the user can select to search for "bill, bills, account, charges, invoice, statement, billing, billed, bell", which will most likely return better results because it takes into account the differences of expression.

In one enhancement, the expansion option 1080 allows for the identification of temporal relationships between words, phrases and other collected events in order to better identify the context of the conversation. For example, a search that includes the word "supervisor" in a temporal relationship with words like "transfer me to", or in relationship to a call transfer event, can provide much more context than a search for "supervisor". The expansion option allows users to capture more instances of the concept that they are exploring and furthermore establish the intent of the calls. This improves upon keyword-spotting technologies, which are not good enough to perform ad-hoc searching for concepts, which is the ultimate goal in content discovery.

The analytics function 385 further enables the user a variety of ways to derive insight from the search results. The Call Replay 1090 component allows the user to listen to an audio file from the search results, in part or its entirety. Playing a portion of the audio allows the user to more efficiently go through the search results without having to waste time listening to the whole conversation. The Text Display 1092 component shows a continuous text for the entire recognized content when playing back part or all of a call. This allows users to quickly capture terms and expressions exchanged in the call that might be of importance. The Save Searches 1094 component allows a user to save and easily retrieve searches for further refinement and analysis. The Export component 1096 allows search results to be exported to a wide variety of formats, such as Microsoft Excel or Adobe PDF format. The Search Statistics component 1098 displays information on the current search (e.g. calls counted, search time). In one enhancement, the analytics function 385 further includes call visualization component which includes an interface for displaying the text of a set of calls along with other data captured by the integrated system of the present invention along with integrated sources. A call visualization component is more fully described in the '705 application and incorporated by reference above.

Preferably, the analytics function 385 automatically classifies and scores calls via classify calls module 1062 and a score calls module 1064. This feature can greatly reduce the time and effort that contact centers spend on the quality monitoring process by "structuring" unstructured voice recordings and categorizing them. The classify calls module 1062 preferably classifies calls based on the content. A call may be classified into one or more "buckets." The analytics function 385 relies on the concept that all conversational threads have at their core one or more "patterns" of speech. Patterns are complex descriptions of different ways that people communicate information, not just simple "words" for matching. These patterns of speech do not have to contain exact word matches for particular search terms, but they only "look" like a specific pattern. Each pattern is defined and assigned a weight by the pattern developer, and each area of intent is assigned a threshold. If a group of patterns match and their added weights exceed the threshold, then that conversation is said to "look" like and contain that intent.

The weights and threshold are user definable and therefore easily tweaked to produce better and more accurate results. A typical intent "bucket" will contain anywhere from five to 100 "patterns" to match. Patterns can be shared across domains and industries, and pattern bases can evolve forward to deliver ever more accurate and finely tuned pattern matching.

The analytics function 385 uses patterns not only to classify calls via the classify calls module 1062, but also to evaluate if a particular activity occurred during a call via the score calls module 1064. The user begins by designating the objective criteria on which the calls are to be scored into the application. A set of patterns is then described for the criteria. A call is then scored based on the extent to which the criteria patterns were fully met, partially met, or not met at all. Each weighted threshold for each score level can be customizable.

The analytics function 385 allows the user to create a graphical representation of trends found in the calls via a graphical representation module 1066. This enables a user to view statistics about complex trends over a large time period.

The trend view displays a suite of ad-hoc reports that can be easily configured by the parameters in Table 1.

TABLE 1

| Time/Day Interval | Value to Calculate | Segmentation |
| --- | --- | --- |
| Day of Week | Avg # Words Per Call | By Agent |
| Month | Avg Call Length In Seconds | By Agent Group |
| By Week | Call Count | By Content Group |
| By Quarter | Hit Total | By Customer Account |
| By Year | Sum (WAVLength) | By Department |
| By Location | | |

By visualizing the information by the parameters above, the user can gain a more detailed view on the particularities of the search phrases.

Another trending capability is the display of, for example, the top 200 words mentioned in the recorded calls (where the number of top words is customizable). The analytics function 385 proactively shows the words that are unusually more frequent than before or compared to the standard language. This acts as an "early warning system" to enable organizations to understand how the conversations have changed from one period to the next.

Preferably, the analytics function 385 organizes and delivers results customized to the end-users requirements via a reports module 1068. In an enhancement, reports module 1068 allows for scheduling options that enable users the ability to vary frequency of report delivery so analysts can zoom in on critical data metrics hourly, daily, monthly, etc. Users can customize and automate reporting. Once a query is created, the user can save the query to run automatically. Users can create and view reports in different formats while using the web-based viewer. For example, reports can be output as Excel or PDF files, and then emailed. The reports are interactive, in that calls can be played back live from the results of the report. The reports module 1068, which is preferably based on industry-standard databases such as SQL, can be used to customize reports, to extract, format and report from the underlying data. In another enhancement, the reports module 1068 is a dashboard reporting system which can, for example, link the actual calls detected for each event or report.

Back Office and Branch Office Integration

As will be described in greater detail here, some embodiments of workforce optimization systems and methods can involve integration of contact centers, back offices and/or branch offices. In this regard, it should be noted that back and branch offices have traditionally involved a process centric approach to optimization, whereas contact centers have tended to involve a workforce centric approach to optimization. Despite these differences, however, embodiments of workforce optimization systems and methods can integrate these environments in such a manner that potentially offers improvements in efficiency of operations.

With respect to the integration of both branch and back offices relative to workforce optimization, various functions such as workforce management, quality monitoring, e-learning, performance management, analytics and/or coaching functionality can be involved. Each of these areas is described in greater detail below.

For workforce management, tasks such as forecast and scheduling, and adherence monitoring of personnel performance can be used. In this regard, a forecasting and scheduling component (e.g., component 350 of FIG. 3) can calculate staffing levels and schedules based on historical interaction patterns. Notably, such interaction levels may not be based on ACD information as may be commonplace with information regarding contact center agents. In this case, such information may include historically high customer traffic times at a branch office. Thus, much like scheduling of agents at a contact center, scheduling of agents at a branch or back office can be accommodated.

Another aspect of forecasting and scheduling involves the concept of an integrated workforce to the extent that agents assigned to a branch office or back office may possess the requisite skills to perform tasks typically allocated to contact center agents. In this regard, the personnel at either a branch or back office could be scheduled to handle customer contacts, e.g., incoming phone calls, which are typically routed to contact center agents by an ACD, for example. In those embodiments that provide such a level of integration, a bank teller, for example, could be scheduled for interacting with customers that call into a related contact center during historically low customer volume times at the bank. In this manner, an additional agent need not be scheduled to work at the contact center.

A tracking component (e.g., component 355 of FIG. 3) can provide a supervisor or manager with information about agent activities and agent-customer interactions, both historical and real-time. An adherence component (e.g., component 360 of FIG. 3) supplies the supervisor with information on how well each agent complies with policies. For example, once schedules are created, these components enable a supervisor to ensure that agents follow the schedules.

Unlike a typical contact center, however, the parameters used to evaluate various aspects of branch and back office personnel can be different. By way of example, adherence monitoring of a contact center agent typically is conducted with reference to activity of an ACD, which routes calls to available agents. In a branch or back office, however, the activity of responding to customer calls may not take place on a regular enough basis for this activity alone to server as an accurate indicator of adherence. Thus, other indicators can be used. For instance, on-screen activity can be monitored. that is, a screen capture engine can be used to acquire information corresponding to the workstation activity of the agents, thereby providing an indication of whether the agent is at the workstation.

Thus, the concept of integrating contact center, branch office and back office agents involves multiple aspects of utilization personnel of resources. In this regard, FIG. 11 is a flowchart that depicts the functionality of an embodiment of a system for providing workforce optimization. As shown in FIG. 11, the functionality (or method) may be construed as involving redirecting a customer contact, which was directed to a customer contact center staffed by agents dedicated to interacting with customers, to a branch office or a back office. This enables an agent of the branch office or of the back office to interact with the customer associated with the customer contact instead of an agent of the contact center.

Another embodiment of a method for providing workforce optimization is depicted in FIG. 12. As shown in FIG. 12, the functionality (or method) may be construed as beginning at block 1202, in which a first campaign is planned to implement business goals. In block 1204, a workforce is scheduled and deployed in accordance with the campaign to produce a plurality of interactions, at least one of the interactions involving a customer and a first agent of a contact center, at least another of the interactions involving a customer and a second agent of a branch office or back office. In block 1206, performance of the first agent and the second agent is measured on at least a portion of the interactions to produce a set of quality metrics for the agents and in block 1208, at least a portion of quality metrics are combined to produce performance indicators. Then, as depicted in block 1210, the performance indicators are used in the planning step of a second campaign or another iteration of the first campaign.

Figure 13:
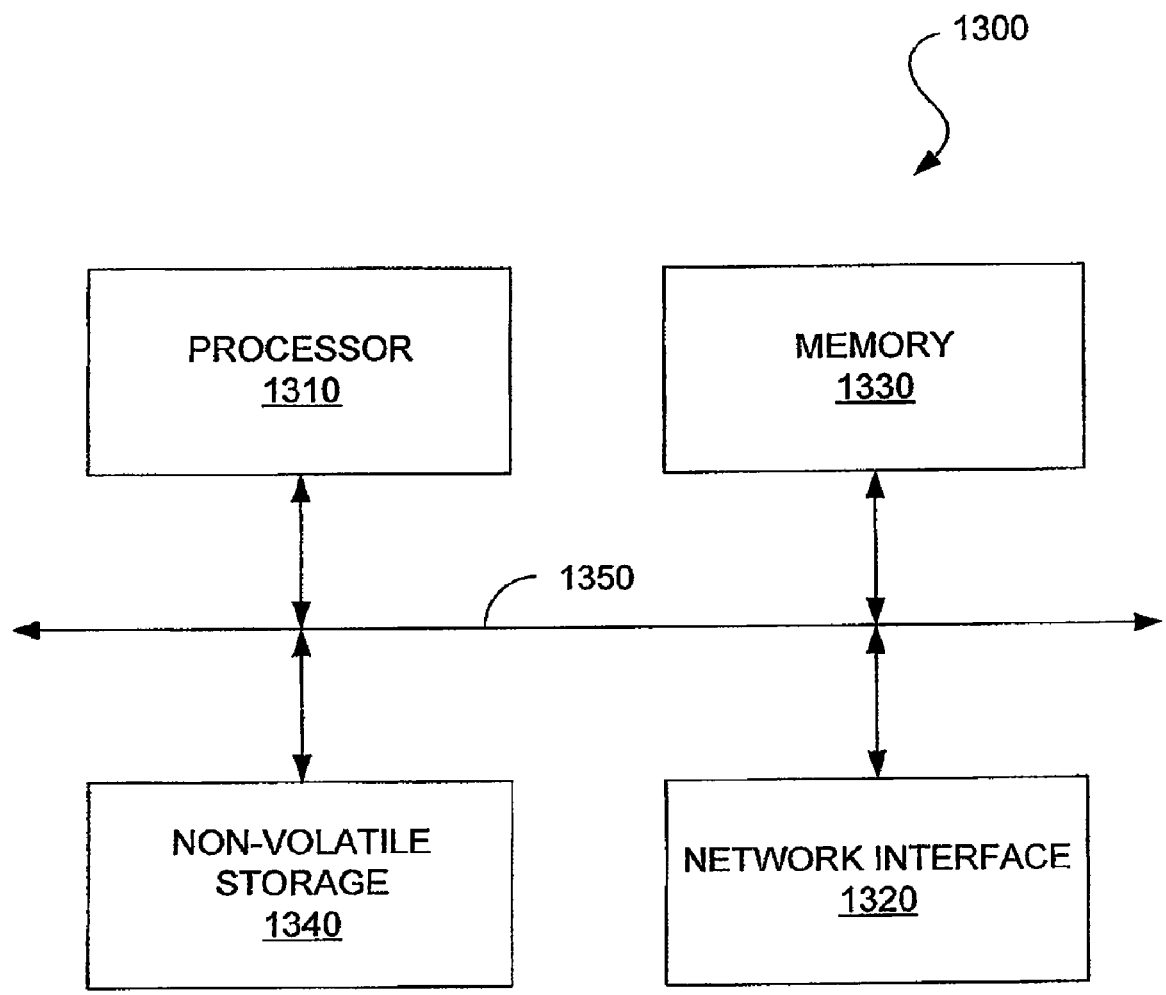
FIG. 13 is a schematic diagram depicting an embodiment of a system implemented by a computer.

FIG. 13 is a hardware block diagram of a general-purpose computer 1300 that can be used to implement one or more of the components of the integrated contact center systems 300 (e.g., 300*a*-300*d*) disclosed herein, or the integrated contact center processes or methods disclosed herein. The computer 1300 contains a number of components that are well known in the art of call center software, including a processor 1310, a network interface 1320, memory 1330, and non-volatile storage 1340. Examples of non-volatile storage include, for example, a hard disk, flash RAM, flash ROM, EEPROM, etc. These components are coupled via a bus 1350. The memory 1330 contains instructions which, when executed by the processor 1310, implement the methods and systems disclosed herein. Omitted from FIG. 13 are a number of conventional components, known to those skilled in the art that are unnecessary to explain the operation of the system 1300.

The systems and methods disclosed herein can be implemented in software, hardware, or a combination thereof. In some embodiments, the system and/or method is implemented in software that is stored in a memory and that is executed by a suitable microprocessor (µP) situated in a computing device. However, the systems and methods can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example but not limited to, a system or propagation medium that is based on electronic, magnetic, optical, electromagnetic, infrared, or semiconductor technology.

Specific examples of a computer-readable medium using electronic technology would include (but are not limited to) the following: an electrical connection (electronic) having one or more wires; a random access memory (RAM); a read-only memory (ROM); an erasable programmable read-only memory (EPROM or Flash memory). A specific example using magnetic technology includes (but is not limited to) a portable computer diskette. Specific examples using optical technology include (but are not limited to) optical fiber and compact disc read-only memory (CD-ROM).

It should be noted that any process descriptions or blocks in flowcharts should be understood as representing modules, segments, or portions of code which include one or more executable instructions for implementing specific logical functions or steps in the process. As would be understood by those of ordinary skill in the art of the software development, alternative embodiments are also included within the scope of the disclosure. In these alternative embodiments, functions may be executed out of order from that shown or discussed, including substantially concurrently or in reverse order, depending on the functionality involved.

This description has been presented for purposes of illustration and description. It is not intended to be exhaustive or to limit the disclosure to the precise forms disclosed. Obvious modifications or variations are possible in light of the above teachings. The embodiments discussed, however, were chosen to illustrate the principles of the disclosure, and its practical application. The disclosure is thus intended to enable one of ordinary skill in the art to use the disclosure, in various embodiments and with various modifications, as are suited to the particular use contemplated. All such modifications and variation are within the scope of this disclosure, as determined by the appended claims when interpreted in accordance with the breadth to which they are fairly and legally entitled.

The invention claimed is:

1. A method for providing workforce optimization comprising:
   planning a first campaign to implement business goals;
   scheduling and deploying a workforce by a forecasting and scheduling component of a workforce management system implemented on a computer in accordance with the first campaign to produce a plurality of interactions, at least one of the interactions involving a customer and a first agent of a contact center, at least another of the interactions involving a customer and a second agent of a branch office or back office, the other of the interactions resulting from at least one customer contact intended for the contact center being selectively redirected from the contact center to the branch office or the back office based on a known skill set of the second agent, wherein the branch office or the back office is part of the same enterprise as the contact center but the primary purpose is not handling customer contacts;
   the scheduling step further comprises:
      scheduling the agent of the branch office or of the back office such that the agent is available for receiving redirected customer contacts, and
      scheduling agents of the customer contact center based on availability of agents of the branch office or of the back office to accommodate customer contacts
   measuring performance of the first agent and the second agent on at least a portion of the interactions by a tracking component of the workforce management system implemented on the computer to produce a set of quality metrics for the agents, wherein the performance of the first agent is measured using a first parameter and the performance of the second agent is measured using a second parameter different from the first, the first parameter is from an automatic call distributor (ACD) and the second parameter is from workstation screen activity for the second agent;
   combining at least a portion of quality metrics to produce performance indicators; and
   using the performance indicators in the planning step of a second campaign or another iteration of the first campaign;
   tracking adherence, by an adherence component of the workforce management system implemented on the computer, of the first agent and the second agent to campaign schedules created in the planning step;
   supplying information to a supervisor regarding the adherence of the first agent and the second agent to the campaign schedules.

2. The method of claim 1, wherein the business goals are defined in terms of metrics that describe how the agents are expected to perform.

3. The method of claim 1, further comprising allocating a contact directed to the contact center to an agent of the branch office or the back office such that an agent of either the branch office or an agent of the back office interacts with a customer attempting to contact the contact center.

4. The method of claim 1, wherein measuring performance of the second agent comprises:
   capturing screen data associated with a workstation of the second agent; and
   analyzing the screen data to determine at least some of the quality metrics.

5. The method of claim 1, further comprising recording at least a portion of the interactions.

6. The method of claim 5, wherein measuring performance comprises measuring performance by using quality monitoring and call recording tools to assess at least one quality score and at least one of the interactions.

7. The method of claim 1, further comprising using analytics to provide insights on at least one skill or knowledge gap of at least one of the agents.

8. The method of claim 7, further comprising providing training to address the at least one skill and knowledge gap for the at least one of the agents.

9. The method of claim 1, further comprising:
   analyzing and identifying opportunities and correlating the opportunities with at least one key performance indicator and at least one scorecard; and
   developing at least one quality monitoring score to be used by the workforce management system to produce staffing models that integrate the agents of the contact center and at least one of the branch office and the back office.

10. A system for providing workforce optimization comprising:
   a forecasting and scheduling component of a workforce management system implemented on a computer operative to plan a first campaign to implement business goals and to schedule and deploy a workforce in accordance with the first campaign to produce a plurality of interactions, at least another of the interactions involving a customer and a second agent of a branch office or back office, the other of the interactions resulting from at least one customer contact intended for the contact center being selectively redirected from the contact center to the branch office or the back office based on a known skill set of the second agent, wherein the branch office or the back office is part of the same enterprise as the contact center but the primary purpose is not handling customer contacts, the scheduling step further comprises: scheduling the agent of the branch office or of the back office such that the agent is available for receiving redirected customer contacts, and scheduling agents of the customer contact center based on availability of agents of the branch office or of the back office to accommodate customer contacts;
   a tracking component of the workforce management system implemented on the computer operative to measure performance of the first agent and the second agent on at least a portion of the interactions to produce a set of quality metrics for the agents, wherein the performance of the first agent is measured using a first parameter and the performance of the second agent is measured using a second parameter different from the first, the first parameter is from an automatic call distributor (ACD) and the second parameter is from workstation screen activity for the second agent; and to combine at least a portion of quality metrics to produce performance indicators:

the forecasting and scheduling component further operative to use the performance indicators in the planning step of a second campaign or another iteration of the first campaign;

an adherence component of the workforce management system implemented on the computer operative to track adherence of the first agent and the second agent to campaign schedules created in the planning step and supply information to a supervisor regarding the adherence of the first agent and the second agent to the campaign schedules.

11. The system of claim 10, wherein the tasks directed to the contact center comprise contacts by customers.

12. The system of claim 10, further comprising an automatic call distributor (ACD) operative to receive customer contacts and to route the contacts to agents of the contact center.

13. The system of claim 12, wherein at least some of the contacts are Internet Protocol (IP) telephone contacts and the ACD is operative to route at least some of the IP telephone contacts, that were directed to the contact center by customers, to at least one of the branch office and the back office.

14. The system of claim 10, further comprising a recorder operative to record interactions between the agents and the customers.

15. The system of claim 10, further comprising a screen capture engine operative to capture screen shots associated with record interactions between the customers and the agents of the branch office or the back office.

\* \* \* \* \*